United States Patent [19]

Bhattacharyya et al.

[11] 4,443,576

[45] Apr. 17, 1984

[54] TERPOLYMER COMPOSITION

[75] Inventors: Bhupati R. Bhattacharyya, Downers Grove; Manuel Slovinsky, Woodridge; Raymond J. Wachala, Chicago; Lawrence E. Beske, Palos Hills; Michael L. McCullar, Warrenville, all of Ill.

[73] Assignee: Nalco Chemical Company, Oak Brook, Ill.

[21] Appl. No.: 362,686

[22] Filed: Mar. 29, 1982

[51] Int. Cl.³ .............................................. C08L 33/00
[52] U.S. Cl. ................................. 524/522; 525/296; 525/201; 525/217; 526/320; 526/303.1; 526/240
[58] Field of Search ................... 526/320, 303.1, 240; 524/522; 525/296, 201, 217

[56] References Cited

U.S. PATENT DOCUMENTS

| | | | |
|---|---|---|---|
| Re. 28,474 | 7/1974 | Anderson et al. | 523/336 |
| Re. 28,576 | 10/1975 | Anderson et al. | 523/336 |
| 2,798,053 | 7/1957 | Brown | 526/271 |
| 3,284,393 | 11/1966 | Vanderhaff et al. | 526/207 |
| 3,488,215 | 1/1970 | Sheperd et al. | 526/320 |
| 3,624,019 | 11/1971 | Anderson et al. | 524/375 |
| 3,734,873 | 5/1973 | Anderson et al. | 523/336 |
| 3,767,629 | 10/1973 | Vallino et al. | 526/84 |
| 3,826,771 | 7/1974 | Anderson et al. | 524/606 |
| 3,915,920 | 10/1975 | Slovinsky et al. | 524/521 |
| 3,970,633 | 7/1976 | Miller et al. | 526/320 |
| 3,996,180 | 12/1976 | Kane | 524/801 |
| 3,997,492 | 12/1976 | Kane et al. | 524/801 |
| 4,024,097 | 5/1977 | Slovinsky et al. | 524/723 |
| 4,143,222 | 3/1979 | Goretta et al. | 526/240 |
| 4,196,272 | 4/1980 | Goretta et al. | 526/222 |
| 4,330,450 | 5/1982 | Lipowski et al. | 524/551 |

*Primary Examiner*—Joseph L. Schofer
*Assistant Examiner*—N. Sarofim
*Attorney, Agent, or Firm*—John G. Premo; Robert A. Miller; Donald G. Epple

[57] ABSTRACT

Novel polymeric compositions useful as thickeners and rheology modifiers for oil-in-water emulsion systems are disclosed. The water-soluble or swellable compositions described contain, prior to polymerization, from:

| | |
|---|---|
| 10–70% | Acrylamide or methacrylamide; |
| 20–70% | Acrylic acid, methacrylic acid, or their water-soluble salts; |
| 5–50% | Of a hydroxyalkylacrylate; |
| 0–10% | Of a polyfunctional monomeric branching material; and, |
| 0–15% | Low molecular weight water-soluble copolymer of a non-ionic or anionic water-soluble vinyl addition monomer and lower alkylacrylate. |

Optionally a water-soluble polymer dispersant may be added to the composition after polymerization.

15 Claims, No Drawings

TERPOLYMER COMPOSITION

INTRODUCTION

Certain water-soluble vinyl addition polymers have been known in the art as thickening agents for oil-in-water emulsion and mixed emulsion dispersion systems having an aqueous continuous phase. Typically these materials have been homo or copolymers of acrylamide and other water-soluble vinyl addition monomers such as acrylic acid. Natural polymers such as xanthan gums, and various cellulose derived materials such as hydroxyethylcellulose have also been used as thickening agents.

While performing well as thickening agents, these materials have not been successful as rheology modifiers for aqueous or oil-in-water emulsion systems. Spreading ability, leveling characteristics, viscosity, and thixotrophy to mention several of the rheological properties of latex paints, water-based inks, water-borne and latex adhesives, asphalt emulsions, cosmetics and the like have not been satisfactory using presently available commercial materials.

It is, therefore, an object of this invention to provide to the art a unique water-soluble material which is useful as a rheology modifier for aqueous and oil-in-water emulsion systems.

It is a further object of this invention to provide to the art a water-swellable polymeric composition which, when added to aqueous oil-in-water emulsion systems, will improve the rheology thereof.

A still further object of this invention is to provide to the art a novel method for improving the rheology of oil-in-water emulsion and mixed emulsion dispersion systems including latex paints, water-based inks and water-borne and latex adhesives.

Further objects will appear hereinafter.

The subject invention is directed toward a novel composition which has as its basis a high molecular weight terpolymer of a nonionic vinyl monomer, an anionic vinyl monomer, and an hydroxy alkyl acrylate wherein the acrylate group contains from 1-6 carbon atoms. This terpolymer may be prepared with or without other additives present, including certain branching materials which will be hereinafter described and certain low molecular weight water-soluble vinyl addition polymers which will also be described hereinafter. Optionally, a low molecular weight polymeric dispersant may be added to the finished material to improve stability of the oil-in-water emulsion system to which the terpolymer system is added.

The polymeric compositions of this invention generally contain the following ingredients in the stated percentages prior to polymerization:

(a) 10–70% non-ionic water-soluble vinyl addition monomer;
(b) 20–70% anionic water-soluble vinyl addition monomer;
(c) 5–50% hydroxy alkyl acrylate wherein the alkyl group contains from 2–6 carbon atoms;
(d) 0–10% of a polyfunctional monomeric branching material to be described herein; and
(e) 0–15% of a water-soluble vinyl addition polymer having a molecular weight of from 1,000–150,000.

Preferably, the compositions of this invention will contain the following percentages of (a)–(e).

(a) 20–60
(b) 30–50
(c) 10–35
(d) .05–5
(e) .1–10

Most preferably, the compositions of this invention will contain the following percentages of (a)–(e):

(a) 30–50
(b) 35–50
(c) 10–30
(d) .1–4
(e) .25–5

THE NON-IONIC WATER-SOLUBLE VINYL ADDITION MONOMER

Acrylamide and methacrylamide are the preferred non-ionic water-soluble vinyl addition monomers used in the compositions with acrylamide being most preferred. Other non-ionic water-soluble vinyl addition monomers capable of polymerizing with the other ingredients of this invention may, however, also be employed in major or minor amounts.

THE ANIONIC WATER-SOLUBLE VINYL ADDITION MONOMERS

Acrylic acid, methacrylic acid, and their alkali metal and ammonium salt forms are the preferred water-soluble anionic vinyl addition monomers used in this invention. Acrylic acid and its water-soluble salts are most preferred. Other anionic water-soluble vinyl addition monomers should be chosen based upon their ability to polymerize with the other ingredients, and which can be employed in the compositions of this invention, in combination with the preferred monomers or alone include acrylamido-methyl-2-propane sulfonic acid (AMPS), itaconic acid, maleic acid, maleic anhydride, etc. It is important in selecting other monomeric materials that the final polymer product of this invention must be water-soluble or water-swellable.

THE HYDROXY ALKYL ACRYLATE

The hydroxy alkyl acrylate should have an alkyl group of from 2–6, and preferably 2–4 carbon atoms. The material employed may or may not have a $C_1$–$C_2$ alkyl group on the beta carbon. While a preferred material is 2-hydroxy ethyl methacrylate, other materials that can be employed include: hydroxy ethyl acrylate, hydroxy propyl acrylate, hydroxy butyl acrylate, hydroxy propyl methacrylate, hydroxy ethyl ethacrylate, hydroxy propyl ethacrylate and the like. Alkoxy alkyl acrylates and methacrylates can also be used.

THE POLYFUNCTIONAL MONOMERIC BRANCHING MATERIAL

The polyfunctional monomeric branching materials useful in this invention include so-called polyalkenyl polyethers, as well as difunctional monomers such as N-N'-methylene bis-acrylamide, other alkylidene-bis-acrylamides, divinyl benzene sulfonate, ethylene glycol diacrylate, ethylene glycol dimethyacrylate, diallyl ethylene glycol ether, acrylic or methacrylic ester of polyethylene glycol (e.g., polyethylene glycol-600 diacrylate), and divinyl ether of polyethylene glycol and like multi-functional monomers containing two or more $CH_2=C<$ groupings which are somewhat water-soluble.

The polyalkenyl polyethers useful are described in U.S. Pat. No. 2,798,053 which is hereinafter incorporated by reference. These materials contain more than one alkenyl ether grouping per molecule and those most useful possess alkenyl groups in which an olefinic double bond is present attached to a terminal methylene grouping thusly $CH_2=C<$. They are made by the etherification of a polyhydric alcohol containing at least 4 carbon atoms and at least 3 hydroxyl groups. Compounds of this class are readily produced, for example, by a Williamson-type synthesis, in which an alkenyl halide, or a mixture of such halides, such as allyl chloride, allyl bromide, methallyl chloride methallyl bromide and others, is reacted with a strongly alkaline aqueous solution of one or more of the polyhydric alcohols. The product of such a synthesis usually is a complex mixture of polyethers containing varying number of ether groups on each molecule. Analysis of such materials, therefore, reveals only the average number of ether groupings on each molecule. These mixtures, however, if they analyze as containing an average number of ether groups per molecule greater than one, are capable of producing the water-soluble or swellable polymers of this invention. Since the efficiency of the polyether cross-linking agent increases with the number of potentially polymerizable groups on the molecule, it is much preferred to utilize polyethers containing an average of two or more alkenyl ether groupings per molecule. The polyvinyl polyethers of the polyhydric alcohols within the above broad class are produced by reacting acetylene with the polyhydric alcohol (or an alcoholate thereof) in a Reppe-type vinyl addition synthesis. The polycrotyl ethers of the polyhydric alcohols also are useful although they do not contain a terminal $CH_2=C<$ grouping.

Illustrative polyhydric alcohols of the above-described class that may be utilized in the preparation of the poly alkenyl polyether cross-linking agent include the butane triols such as 1,2,3-butane triol, 2,3,4-trihydroxy butyric acid, the aldotetroses such as erythrose and threose, keto tetroses such as erythrulose; the aldopentoses such as arabinose, xylose, lyxose, and ribose; ketopentoses such as araboketose and xyloketose; aldohexoses such as glucose, galactose, mannose, gulose, idose, talose, allose and the like; ketohexoses such as fructose or levulose, sorbose and the like; other sugars including the mono-, di-, tri- and polysaccharides such as sucrose, maltose, lactose and raffinose; the hexosans, pentosans and hexosan-pentosans, the galactomannan and glucomannan gums, starch and others; reduced forms of the above and other sugars and polysaccharides such as the so-called "sugar alcohols" erythritol, xylitol, mono-, di- and tri-pentaerythritol, arabitol, mannitol, iditol, tolitol, sorbitol, inositol, dulcitol and others; the oxidized derivatives of the sugars in which the oxidation has not been carried to the point where the original monosaccharide carbon chain unit is broken such as the mono- and di-carboxylic "sugar acids" including gluconic acid, glucuronic acid, galactonic acid, galacturonic acids, saccharic acid, mucic and pectic acids and other polyhydric alcohols of the class described.

A preferred class of polyhydric alcohols for use in the production of the polyalkenyl polyether monomer are known as the oligosaccharides, which are defined as containing from one to four monosaccharide units. In addition to the oligosaccharides themselves, their reduction products such as the alcohols, keto-alcohols and aldoalcohols and their oxidation products which retain the original saccharide chain such as the sugar acids, the keto-acids, the alco-acids and the like can be used. Illustrative saccharides of this class are the monosaccharides such as glucose, galactose, fructose, sorbose, rhamnose, and the like, disaccharides such as sucrose, arabinose, maltose, lactose, and the like, trisaccharides such as rafinose and others. Of these the disaccharide, sucrose, is much preferred because of its ready availability and its ability to produce polyethers of great reactivity with carboxylic monomers.

Two particularly useful polyfunctional monomeric branching materials useful in the composition of this invention include:
(a) The reaction product of allyl amine with a copolymer of methyl vinyl ether and maleic anhydride with different mole ratios of allylamine to anhydride.
(b) The adduct of glycerine and allyl glycidyl ether, or 1,2,3-tris(3-allyloxy(2-hydroxypropopyl)propane.

The branching materials are preferably employed in the compositions of this invention and are included to provide a branched structure to the polymeric compositions of this invention. These branched structures should be water-soluble or water-swellable, and must not result in the formation of water-insoluble or water-inswellable compositions.

THE LOW MOLECULAR WEIGHT WATER-SOLUBLE VINYL ADDITION POLYMERS

The low molecular weight water-soluble vinyl addition polymer component of this invention is typically a copolymer of acrylamide, acrylic acid, methacrylamide, methacrylic acid with an alkyl acrylate such as methyl acrylate, ethyl acrylates propyl acrylate and 2-ethyl hexyl acrylate. Accordingly, the alkyl group can range from 1-8 carbon atoms.

The ratios of these polymers (vinyl monomer:acrylate) can vary from 50:50 to 95:5, with a preferred weight ratio being from 70:30 to 90:10. A preferred low molecular weight water-soluble polymer is an 80:20 by weight copolymer of acrylic acid and methyl acrylate produced by the method of U.S. Pat. No. 4,196,272 which is hereinafter incorporated by reference. Other 8eight ratios of monomers, as well as other method of preparation can be employed to obtain satisfactory compositions of this invention. When using acrylic or methacrylic acid as a comonomer the resulting polymer may be used as is, or, may be employed as the alkali-metal or water-soluble salt.

The molecular weights of the low molecular weight water-soluble polymer may vary from 1,000 to 150,000 and is preferably from 2,000-50,000. Most preferred molecular weights range from 2,000-10,000.

THE PREPARATION OF THE COMPOSITIONS

The polymeric compositions of this invention are prepared by subjecting the ingredients to free radical conditions so as to form water-soluble or swellable polymeric materials. The molecular weight of the resultant composition can vary greatly and may be "tailor-made" by methods known in the art for particular applications. Generally, however, molecular weights of the compositions of this invention will exceed 500,000 and will generally exceed 1,000,000. When forming the water-swellable polymers of this invention, molecular weight is impossible to measure, precisely, due to the fact that these three-dimentional polymeric materials will have a molecular weight of infinite dimention but will still remain water-swellable. When preparing materials of this type it is important, however, that molecular weight be high enough to provide activity in the particular application and yet low enough so that the resultant material is water-soluble or swellable.

Accordingly, the polymeric compositions of this invention can be prepared using well-known polymerization techniques including solution, dispersion, and inverse water-in-oil emulsion polymerization methods. Water-in-oil emulsion polymerization methods are the preferred means of obtaining compositions of this invention due to the fact that materials can be prepared in high concentration, the polymer particles prepared have high surface area, and the emulsion can be inverted into the particular aqueous or oil-in-water system into which it is desired to add the polymeric composition.

THE WATER-IN-OIL EMULSIONS OF WATER-SOLUBLE OR SWELLABLE VINYL ADDITION POLYMERS

The water-in-oil emulsions of the water-soluble or swellable vinyl addition polymers useful in this invention contain four basic components. These components and their weight percentages in the emulsions are listed below:

A. Water-soluble or swellable vinyl addition polymer:
1. Generally from 5–60%;
2. Preferably from 20–40%; and
3. Most preferably from 25–35%.

B. Water:
1. Generally from 20–90%;
2. Preferably from 20–70%; and
3. Most preferably from 30–55%.

C. Hydrophobic liquid:
1. Generally from 5–75%
2. Preferably from 5–40%; and
3. Most preferably from 20–30%; and D. Water-in-oil emulsifying agent:
1. Generally from 0.1–21%;
2. Preferably from 1–15%;
3. Most preferably from 1.2–10%.

It is also possible to further characterize the water-in-oil emulsions of water-soluble or swellable vinyl addition polymers with respect to the aqueous phase of the emulsions. This aqueous phase is generally defined as the sum of the polymer or copolymer present in the emulsion plus the amount of water present in the emulsion. This terminology may also be utilized in describing the water-in-oil emulsions which are useful in this invention. Utilizing this terminology, the aqueous phase of the water-in-oil emulsions of this invention generally consists of 25–95% by weight of the emulsion. Preferably, the aqueous phase is between 60–90% and most preferably from 65–85% by weight of the emulsion.

The emulsions also may be characterized in relation to the water/oil ratios. This figure is simply a ratio of the amount of water present in the emulsion divided by the amount of hydrophobic liquid present in the emulsion. Generally, the water-in-oil emulsions of this invention will have a water/oil ratio of from 0.25 to 18. Preferably, the water-in-oil ratio will range from 0.5–14, and most preferably from 1.0–2.75.

THE HYDROPHOBIC LIQUIDS

The hydrophobic liquids or oils used in preparing these emulsions may be selected from a large group of organic liquids which include liquid hydrocarbons and substituted liquid hydrocarbons.

A preferred group of organic liquids that can be utilized in the practice of this invention are paraffinic hydrocarbon oils. Examples of these types of materials include a branch-chain isoparaffinic solvent sold by Humble Oil and Refinery Company under the trade name "Isopar M" described in U.S. Pat. No. 3,624,019 and a paraffinic solvent sold by the Exxon Company, U.S.A. called "Low Odor Paraffinic Solvent." Typical specifications of this material are set forth below in Table I.

TABLE I

| | |
|---|---|
| Specific Gravity 60° F. | 0.780–0.806 |
| Color, Saybolt | + 30 min. |
| Appearance, visual | Bright and Clear |
| Aniline Point, °F., ASTM D-611 | 160 min. |
| Distillation, °F., ASTM D-86 | |
| IBP | 365 min. |
| FBP | 505 max. |
| Flash Point, °F., TCC | 140 min. |
| Sulfur, ppm, Microcoulometer | 15 max. |

While paraffinic oils are the preferred materials for use in preparing the water-in-oil emulsions of this invention, other organic liquids can be utilized. Thus, mineral oils, kerosenes, naphthas, and in certain instances petroleum may be used. While useful in this invention, solvents such as benzene, xylene, toluene, and other water immiscible hydrocarbons having low flash point or toxic properties are generally avoided due to problems associated with their handling.

THE WATER-IN-OIL EMULSIFYING AGENTS

Any conventional water-in-oil emulsifying agent can be used such as sorbitan monostearate, sorbitan monooleate, and the so-called low HLB materials which are all documented in the literature and are summarized in the Atlas HLB Surfactants Selector. Although the mentioned emulsifiers are used in producing good water-in-oil emulsions, other surfactants may be used as long as they are capable of producing these emulsions. It is also contemplated, however, that other water-in-oil emulsifying agents can be utilized.

U.S. Pat. No. 3,997,492 shows the use of emulsifiers generally having higher HLB values to produce stable emulsions similar in character to those discussed above. With the use of the equations present in this reference, which is hereinafter incorporated by reference, emulsifiers having HLB values between 4–9 can be utilized in the practice of this invention.

In addition to the reference described above, U.S. Pat. No. 4,024,097 discloses particular emulsifying agents for the water-in-oil emulsions, which are the subject of this invention. These emulsions are generally prepared according to this reference utilizing a water-in-oil emulsifying agent comprising a partially esterified lower N,N-dialkanol substituted fatty amide. Additionally, other surfactants may be combined to produce emulsions having small particle sizes and excellent storage stability.

THE PREPARATION OF THE WATER-IN-OIL EMULSIONS OF WATER-SOLUBLE OR SWELLABLE VINYL ADDITION POLYMERS

The general method for the preparation of emulsions of the type described above is contained in Vanderhoff, U.S. Pat. No. 3,284,393, which is hereinafter incorporated by reference. A typical procedure for preparing water-in-oil emulsions of this type includes preparing an aqueous solution of the water-soluble vinyl addition monomers to be employed and adding this solution to one of the hydrocarbon oils described above. With the addition of a suitable water-in-oil emulsifying agent and under agitation, the emulsion is then subjected to free radical polymerization conditions and a water-in-oil emulsion of the water-soluble or swellable vinyl addition polymer is obtained. It should be pointed out that the ingredients are chosen based upon the weight percentages given above and their compatability with each other. As to choice of free radical catalyst, these materials may be either oil or water-soluble and may be from the group consisting of organic peroxides, azobisisobutyronitrile type materials, redox type initiator systems, etc. Additionally, ultraviolet light, microwaves, etc. will also cause the polymerization of water-in-oil emulsions of this type.

In the manufacture of emulsions of this type, which are further detailed in U.S. Pat. No. 3,624,019, U.S. Pat. No. Re. 28,474, U.S. Pat. No. 3,734,873, U.S. Pat. No. Re. 28,576, U.S. Pat. No. 3,826,771, all of which are hereinafter incorporated by reference, the use of air may be employed to control polymerization. This technique is described in U.S. Pat. No. 3,767,629 which is also hereinafter incorporated by reference.

In addition to the above references, U.S. Pat. No. 3,996,180 described the preparation of water-in-oil emulsions of the types utilized in this invention by first forming an emulsion containing small particle size droplets between the oil, water, monomer and water-in-oil emulsifying agent utilizing a high shear mixing technique followed by subjecting this emulsion to free radical polymerization conditions. Also of interest is U.S. Pat. No. 4,024,097 which describes water-in-oil emulsions such as those described above utilizing particular surfactant systems for the water-in-oil emulsifying agent, allowing for the preparation of latexes having small polymer particle sizes and improved storage stability.

Another reference, U.S. Pat. No. 3,915,920, discloses stabilizing water-in-oil emulsions of the type above described utilizing various oil-soluble polymers such as polyisobutylene. Employment of techniques of this type provides for superior stabilized emulsions.

Of still further interest is U.S. Pat. No. 3,997,492 which describes utilizing emulsifiers having HLB values of between 4–9.

PHYSICAL PROPERTIES OF THE WATER-IN-OIL EMULSIONS

The water-in-oil emulsons of the finely divided water-soluble or swellable polymers useful in this invention contain relatively large amounts of polymer. The emulsions are quite stable when the particle size of the polymers are contained in the emulsions from the range of 0.1 microns up to about 5 microns. The preferred particle size is generally within the range of 0.2 microsn to about 3 microns. A most preferred particle size is generally within the range of 0.2 to 2.0 microns.

The emulsions prepared having the above composition generally have a viscosity in the range of from 50 to 1000 cps. It will be seen, however, that the viscosity of these emulsions can be affected greatly by increasing or decreasing the polymer content, oil content, or water content as well as the choice of a suitable water-in-oil emulsifier.

Another factor attributing to the viscosity of these types of emulsions is the particle size of the polymer which is dispersed in the discontinuous aqueous phase. At any rate, it will be readily apparent to those skilled in the art as to how the viscosity of these types of materials can be altered. It will be seen that all that is important in this invention is the fact that the emulsion be somewhat fluid, i.e. pumpable.

THE INVERSION OF THE WATER-IN-OIL EMULSIONS OF THE WATER-SOLUBLE OR SWELLABLE VINYL ADDITION POLYMERS

The water-in-oil emulsions of the water-soluble or swellable polymers discussed above have unique ability to rapidly invert when added to aqueous solutions or oil-in-water emulsions in the presence of an inverting agent or physical stress. Upon inversion, the emulsion releases the polymer into water in a very short period of time when compared to the length of time required to dissolve a solid form of the polymer. This inversion technique is described in U.S. Pat. No. 3,624,019, hereinafter incorporated by reference. As stated in the Anderson reference, the polymer-containing emulsions may be inverted by any number of means. The most convenient means resides in the use of a surfactant added to either the polymer-containing emulsion, or the water or oil-in water emulsion into which it is to be placed. The placement of a surfactant into the water or oil-in-water emulsion causes the water-in-oil emulsion to rapidly invert and release the polymer in the form of an aqueous solution. When this technique is used to invert the polymer-containing emulsion the amount of surfactant present in the water or oil-in-water emulsion may vary over a range of 0.01 to 50 percent based on the polymer. Good inversion often occurs within the range of 1.0–10 percent based on polymer.

The preferred surfactants utilized to cause the inversion of the water-in-oil emulsion of this invention when the emulsion is added to water are hydrophilic and are further characterized as being water soluble. Any hydrophillic type surfactant such as ethoxylated nonyl phenols, ethoxylated nonyl phenol formaldehyde resins, dioctyl esters of sodium succinate and octyl phenol polyethoxy ethanols, etc. can be used. Preferred surfactants are generally nonyl phenols which have been ethoxylated with between 8–15 moles of ethylene oxide. A more complete list of surfactants used to invert the emulsion are found in Anderson, U.S. Pat. No. 3,624,019 at Columns 4 and 5.

The water-in-oil emulsions of the water-soluble or swellable vinyl addition polymers may be readily inverted into the oil-in-water emulsion system, mixed emulsion dispersion system, or aqueous system by simply adding the emulsion to such system in the presence of the high HLB surfactant. This surfactant may be included in the water-in-oil emulsion of the terpolymer, or may be added to the system to which the polymer is to be added. Often times, systems of the type described will already contain a high HLB surfactant and no additional surfactant will be required.

In order to show the preparation of the composition of this invention, the following examples are presented:

EXAMPLE I

A 83:17 by weight copolymer of sodium acrylate and methyl acrylate was prepared according to the teachings of U.S. Pat. No. 4,196,272. The resulting solution contained 30% by weight of the polymer. The polymer had a molecular weight of 6,000–12,000. This material is labeled Example I.

EXAMPLE II

A branching material was prepared by reacting together 3 moles of Gantrez 139, a poly(methyl vinyl ether-maleic anhydride) copolymer of medium molecular weight available from GAF Corporation, Chemical Division, with 1 mole of allylamine. The material is labeled Example II.

EXAMPLE III

This example shows the formation of the compositions of this invention.

To a 1 liter resin flask equipped with condenser, stirrer, thermometer and nitrogen inlet would be added 129.0 g of low odor paraffin solvent mixed with 15.0 g of Span 80, sorbitan monooleate. To this mixture would then be added a solution containing:
1. 40.5 grams acrylic acid
2. 69.83 grams acrylamide
3. 28.0 grams hydroxy ethyl methacrylate
4. 45.0 grams 50% NaOH
5. 179.6 grams water
6. 1.5 grams 2% aqueous solution of Versene (available from Dow Chemical Co.).

The resultant mixture would be stirred, forming a white emulsion, and would be purged with nitrogen to remove oxygen. Upon heating to 47° C. (±1° C.) 7.5 ml of a 0.04 g/ml solution of Vazo®64, an azobisisobutyronitrile from E. I. DuPont de Nemours & Company would be added. An exotherm would develop. The resulting emulsion would be held at 47±° C. for 4½ hours and after the period would have its temperature raised to 70° C. for 1 hour after which time it would be recovered. The resulting product would be a water-in-oil emulsion containing 29.7% by weight of a 46:35:18.6 by weight copolymer of acrylamide:sodium acrylate:2-hydroxy ethyl methacrylate terpolymer. This material is labeled Example III.

EXAMPLE IV

The procedure of Example III was repeated, including 0.55 (active) of the material of Example II. Identical catalyst levels and temperatures were employed. A water-in-oil emulsion containing 29.71% by weight of a slightly branched terpolymer of acrylamide:sodium acrylate:2-hydroxy ethyl methacrylate was recovered. This material is labeled Example IV.

EXAMPLE V

To a 2 l. resin flask equipped with stirrer, thermometer and condenser was added 258.0 g LOPS and 30.0 g Span 80. To this mixture, and with stirring, was added a solution of the following:
139.672 g acrylamide
81.0 g acrylic acid
56.0 g 2-hydroxy ethyl methacrylate
1.10 g Example II
50.0 g Example I (30% active)
3.0 g 2% aqueous solution Versene
310.3 g $H_2O$ After mixing, an emulsion formed. The reaction mixture was heated to 47±1° C. at which time 20.0 ml of a 0.4 g/ml solution of Vazo®64 was added. An exotherm developed, and the temperature was held at 47±1° C. for 5 hours with heating and cooling as necessary. After this period, the temperature was raised to 70° C. for 2 hours after which time the material was recovered. This material is labeled Example V.

EXAMPLE VI

Further synthesis of the compositions of this invention were conducted using the above procedure. Reactants used and amounts are shown in Table II.

TABLE II

| | MONOMER COMPOSITIONS OF RHEOLOGY MODIFIERS | | | | | | | |
|---|---|---|---|---|---|---|---|---|
| Example # | % Brancher Example II | % Acrylamide | % Acrylic Acid | % Methacrylic Acid | % Amps | % HEMA | % HPA | % Example I |
| | (All % based on polymer) | | | | | | | |
| 3 | — | 50 | 30 | — | — | 20 | — | — |
| 6 | 0.4 | 50 | 30 | — | — | 20 | — | 5 |
| 4 | 0.4[1] | 50 | 30 | — | — | 20 | — | 5 |
| 7 | 0.4 | 50 | 30 | — | — | 20 | — | 15 |
| 5 | 0.4 | 50 | 30 | — | — | 20 | — | — |
| 8 | 0.4 | 60 | 30 | — | — | 10 | — | 5 |
| 9 | 0.4 | 50 | 20 | — | 20 | 10 | — | 5 |
| 10 | 0.4 | 50 | 20 | 10 | — | 20 | — | 5 |
| 11 | 0.4 | 50 | 30 | — | — | — | 20 | 5 |
| 12 | 0.4 | 40 | 30 | 10 | — | 20 | — | 5 |
| 13 | 0.4 | 70 | 20 | — | — | 10 | — | 5 |
| 14 | — | 50 | 30 | — | — | 20 | — | 5 |

The % polymer solids in each example is 30% by weight of latex.
[1]Brancher employed was adduct of glycerine and allyl glycidyl ether. (1,2,3-tris (3-allyloxy (2-hydroxypropyl) propane).

APPLICATIONS OF THE COMPOSITION OF THIS INVENTION

The compositions of this invention have been found to be useful rheology modifiers and thickeners for oil-in-water emulsion and mixed emulsion dispersions having a continuous aqueous phase system, as well as aqueous systems. Examples of systems of this type include latex paints, water-borne and latex adhesive materials, oil-in-water asphalt emulsions, oil-in-water cosmetic systems, water-based inks, etc. These systems all have the common property that they are aqueous in nature and have what can be considered to be an aqueous continuous phase. These systems may be true oil-in-water emulsions, mixed emulsion dispersions, such as latex or water-based paints or may, in fact, be dispersions of solids in a aqueous media. In one of the preferred embodiments of this invention we have found that compositions of the type described are particularly useful for mixed emulsion dispersion systems such as latex paints which contain pigment, dispersants, fillers, etc. dispersed in an aqueous system.

When the compositions of this invention are added to oil-in-water emulsion systems, mixed emulsion dispersion systems, or aqueous systems, these systems take on improved properties related to their rheology. Not only is thickening accomplished, but also spreadability is improved, improved film thickness is obtained, thixotropy is improved, less splattering is obtained upon application, and viscosity loss under shear is minimized. In addition, in the case of latex paints, superior tints strengths are obtained.

When employed in the above described systems, the compositions of this invention are generally added to such systems at a level of from 0.1-20% by weight of the composition as a 30% emulsion and most preferably, from 0.25-10% by weight of the composition as a 30% emulsion. Most preferably, they are added at a level of from 0.5-5% by weight of the composition as a 30% emulsion. When using water-in-oil emulsion polymerization systems to prepare the compositions, the water-in-oil emulsion of the composition may be added directly to the above described systems providing that a high HLB surfactant is also included in the oil-in-water emulsion, mixed emulsion dispersion, or aqueous system, or, in the water-in-oil emulsion itself. The compositions of this invention are dispersed throughout the system that is desired to be thickened by simple mixing techniques.

It has been found that when the compositions are added to the above systems, occasionally the viscosity of the oil-in-water emulsion, mixed emulsion dispersion or aqueous system will continue to increase. Accordingly, and to prevent this occurrence, an optional ingredient to the compositions of this invention is a low molecular weight polymeric dispersant. These dispersants are generally vinyl addition polymers having a molecular weight of 1,000–100,000 and preferably 2,000–50,000. Most preferably they have molecular weight of from 2,500–25,000. Ideal dispersants generally have molecular weights of from 5,000–15,000. The dispersants are generally water-soluble homo and copolymers of vinyl monomers including acrylamide, methacrylamide, acrylic acid, methacrylic acid, $C_1$–$C_8$ alkyl acrylates, sulfonated styrene, anhydride, maleic acid, etc. Preferred homo and copolymers include polyacrylic acid, polymethacrylic acid and acrylamide-acrylic acid copolymers. A particularly preferred dispersant is polyacrylic acid having a molecular weight of from 5–10,000.

These dispersants can be made by well-known methods such as those described in U.S. Pat. No. 4,143,222, which is hereinafter incorporated by reference. When employed in the composition of this invention they are added to the final water-soluble or water-swellable polymeric compositions by simple mixing. This post polymerization addition of a dispersant provides extra stability to the final compositions.

When employed, the dispersants are generally added at a level of from 1–30% by weight of a 30% aqueous solution of the dispersant to a 30% by weight water-in-oil emulsion of the terpolymer compositions of this invention. Preferably, the dispersants are added to levels of from 5–25% by weight of a 30% aqueous solution of the dispersant to a 30% by weight water-in-oil emulsion of the terpolymer compositions of this invention. Accordingly, the dispersants are used in relatively large amounts ranging from 5–30% by weight and preferably, 10–25% by weight as low molecular weight polymeric dispersant of the terpolymer composition (as polymer) of this invention.

EXAMPLE XV

A polyacrylic acid having a molecular weight of approximately 8,000–10,000 was prepared using the procedure described in U.S. Pat. No. 4,143,222. This material contained approximately 30% by weight as ammonium polyacrylate.

Experiments were conducted using a flat latex paint formulation consisting of:

| | % |
|---|---|
| Water | 16.052 |
| Dispersant - Tamol 731 (available from the Rohm & Haas Corp.) | 0.434 |
| Surfactant - Igepal C0630(available from the GAF Corp.) | 0.260 |
| Ethylene Glycol | 2.169 |
| Coalescing aid - Texanol (available from Eastman Corp.) | 1.041 |
| Biocide - Dowicil 75 | 0.043 |
| Antifoam - Nalco 2300 (available from Nalco Chemical Co.) | |
| Titanium dioxide - Flat Grade, DuPont TiPure R931 (Hegman 7) | 13.015 |
| Calcium carbonate - Hegman 4 | 17.354 |
| Diatomaceous silica - Hegman 4 | 2.169 |
| Aluminum silicate - Hegman 4 | 6.508 |
| Stabilize at high speed for 10 minutes when using HEC; | |
| Water | 16.052 |
| HEC | — |

*HEC added at 0.43% in Table 2; the example rheology modifiers were added at 1.026% with 0.772% water held out to keep the paint formulation at 100%. The same was done for the optional second dispersant when used.
Formulation Constants:
PVC = 55
WPG = 11.52 lbs./gal.
% solids by wt. = 52

This material was prepared by grinding the above-mentioned ingredients on a high speed disperser for 20 minutes. When using hydroxy ethyl cellulose, which serves as a comparison to those materials previously employed for the purposes of thickening, the mixture was stabilized at a high speed for ten minutes.

After the mixture had been prepared and at low speed, the following ingredients was added.

| Letdown at low speed: | |
|---|---|
| Water | 1.735 |
| PVA latex (55% NVM) - UCAR 366 | 22.560 |
| Example rheology modifier added last | * |
| Optional second dispersant to the paint | * |

A series of tests were run on formulations containing compositions of this invention. These formulations and the results obtained are shown in Table 3 and the appended explanation of terms for Table 3.

Viewing the above results, it is seen that the compositions of this invention provide superior properties to oil-in-water emulsion systems. While latex paints have been shown to be a specific example of an oil-in-water emulsion system, there is no doubt that the compositions can provide suitable properties for other oil-in-water emulsion systems such as those enumerated above.

TABLE 3

PAINT PERFORMANCE RESULTS FOR THE GIVEN EXAMPLE POLYMERS

| Product Tested | Lbs./ 100 Gal. Used | Optional Dispersant (Ex 15)Lbs./ 100 Gal. Used | TS | T₁₆₈ (grams) | Brush | Rollout | Rollout Film Thickness mils wet | 1 Week Stormer Viscosity Sheared | 1 Week Stormer Viscosity Unsheared | ICI High Shear Viscosity (poise) |
|---|---|---|---|---|---|---|---|---|---|---|
| HEC (QP-15,000) | 5 | — | 0 | 100 | Std. | Std. | 7 | 87 | 91 | 0.55 |
| Ex. 6 | 13.9 | — | +2 | 1000 | Better | Better | 9 | 82 | 120 | 0.9 |
| Ex. 4 | ↓ | — | +2 | 900 | Better | Better | 9 | 80 | 115 | 0.9 |
| Ex. 7 | ↓ | — | +2 | 600 | Better | Better | 8 | 79 | 111 | 0.85 |
| Ex. 5 | ↓ | — | −2 | 1000 | Better | Better | 9 | 83 | 123 | 0.9 |
| Ex. 8 | ↓ | — | +2 | 500 | Better | Better | 8 | 79 | 109 | 0.8 |
| Ex. 9 | ↓ | — | +2 | 150 | Equiv. | Equiv. | 7 | 75 | 97 | 0.75 |
| Ex. 10 | ↓ | — | +2 | 500 | Better | Better | 8 | 81 | 110 | 0.9 |
| Ex. 11 | ↓ | — | +1 | 800 | Better | Better | 9 | 81 | 118 | 0.9 |
| Ex. 12 | ↓ | — | 0 | 750 | Better | Better | 8 | 80 | 115 | 0.9 |
| Ex. 13 | ↓ | — | +1 | 400 | Better | Better | 8 | 78 | 107 | 0.8 |
| Ex. 6 | ↓ | 2.8 | +2 | 100 | Better | Better | 9 | 75 | 95 | 0.9 |
| Ex. 4 | ↓ | 2.8 | +2 | 100 | Better | Better | 9 | 74 | 93 | 0.9 |
| Ex. 7 | ↓ | 2.8 | +2 | 100 | Better | Better | 8 | 76 | 96 | 0.85 |
| Ex. V | ↓ | 2.8 | −2 | 100 | Better | Better | 9 | 75 | 95 | 0.9 |
| Ex. 8 | ↓ | 2.8 | +2 | 100 | Better | Better | 8 | 75 | 94 | 0.8 |
| Ex. 14 | ↓ | — | +2 | 800 | Worse | Worse | 8 | 97 | 140 | 1.0 |

NOTE: Paint formula used for these tests is shown as Table 3.
Explanation of Terms in Tables 2 and 3:
Lbs/100 gal. = Pound of product per 100 gallons of paints; polymers are 30% solid, a liquid polymeric product.
QP-15,000 (HEC) = Hydroxyethyl cellulose and 100% solid (Union Carbide).
% Br = Weight percent Brancher, A or B.
% AcAm = Weight percent acrylamide.
% AA = Weight percent acrylic acid.
% MAA = Weight percent methacrylic acid.
% AMPS = Weight percent 2-acrylamido methyl propane sulfonic acid.
% HPA = Weight percent 2-hydroxypropyl acrylate.
% HEMA = Weight percent 2-hydroxy ethyl methacrylate.
T.S. = Tint strength, 0 = good, −2 = darker, +2 = better (lighter).
"T"₁₆₈ = Thixotrophy after 168 hours. Measured as the weight required in grams to produce continuous paddle movement on a Stormer viscometer. Values are within 25 grams.
ICI = High shear viscosity. Measured on an I.C.I. cone and plate viscometer at 10,000 SEC'. Shear values reported in poise.
Brush = Applying paint with ¼" thick, tapered brush on a sealed substrate with light pressure.
Rollout = Applying paint with a ⅜" nap roller cover on a sealed substrate with light pressure.

Having thus described our invention, we claim:
1. A water soluble or swellable composition comprising the product formed by polymerizing together under free radical forming conditions:
   (a) 10–70 weight percent of a water soluble monomer selected from the group consisting of acrylamide and methacrylamide;
   (b) 15–70 weight percent of a monomer selected from the group consisting of acrylic acid, methacrylic acid and water-soluble salts of acrylic acid and methacrylic acid;
   (c) 5–50 weight percent of a lower hydroxy alkyl acrylate;
   (d) 0.5–10% of a water soluble polyfunctional monomeric branching agent having at least two $CH_2=C$ groups; and
   (e) 0.1–15% of a water soluble copolymer having a molecular weight of from 2,000 to 50,000 of:
      (1) a water-soluble monomer selected from the group consisting of acrylamide, acrylic acid, methacrylamide, methacrylic acid and water-soluble salts of acrylic and methacrylic acids; with,
      (2) a $C_1$–$C_8$ alkyl acrylate, the ratio of water-soluble monomer to alkyl acrylate being 50:50 to 95:5.

2. The composition of claim 1 comprising the product formed by polymerizing under free radical forming conditions:
   (a) 20–65 weight percent of a water soluble monomer selected from the group consisting of acrylamide and methacrylamide;
   (b) 20–50 weight percent of a monomer selected from the group consisting of acrylic acid, methacrylic acid and water-soluble salts of acrylic acid and methacrylic acid;
   (c) 10–35 weight percent a lower hydroxy alkyl acrylate;
   (d) 0.05–5.0% of a water soluble polyfunctional monomeric branching agent having at least two $CH_2=C$ groups; and
   (e) 0.1–10% of a water soluble copolymer having a molecular weight of from 2,000 to 50,000 of:
      (1) a water-soluble monomer selected from the group consisting of acrylamide, acrylic acid, methacrylamide, methacrylic acid and water-soluble salts of acrylic and methacrylic acids; with,
      (2) a $C_1$–$C_8$ alkyl acrylate, the ratio of water-soluble monomer to alkyl acrylate being 50:50 to 95:5.

3. The composition of claim 1 comprising the product formed by polymerizing under free radical forming conditions:
   (a) 35–55 weight percent of a water soluble monomer selected from the group consisting of acrylamide and methacrylamide;
   (b) 25–40 weight percent of a monomer selected from the group consisting of acrylic acid, methacrylic acid and water-soluble salts of acrylic acid and methacrylic acid;
   (c) 10–30 weight a lower hydroxy alkyl acrylate;

(d) 0.1–4% of a water soluble polyfunctional monomeric branching agent having at least two $CH_2=C<$ groups; and (e) 0.25–5% of a water soluble copolymer having a molecular weight of from 2,000 to 50,000 of:
  (1) a water-soluble monomer selected from the group consisting of acrylamide, acrylic acid, methacrylamide, methacrylic acid and water-soluble salts of acrylic and methacrylic acids; with,
  (2) a $C_1$–$C_8$ alkyl acrylate, the ratio of water-soluble monomer to alkyl acrylate being 50:50 to 95:5.

4. A water-in-oil emulsion of the composition of claim 1.

5. A water-in-oil emulsion of the composition of claim 2.

6. A water-in-oil emulsion of the composition of claim 3.

7. The composition of claim 1 having added thereto subsequent to polymerization from 0.25 to 15% of a water-soluble vinyl addition polymer having a molecular weight of from 2,000 to 50,000.

8. The composition of claim 2 having added thereto subsequent to polymerization from 0.5 and 30% of a water-soluble vinyl addition polymer having a molecular weight of from 2,500 to 25,000.

9. The composition of claim 3 having added thereto subsequent to polymerization from 10 to 25% of a water-soluble vinyl addition polymer having a molecular weight of from 5,000 to 15,000.

10. A method for improving the rheological properties of oil-in-water emulsion systems, mixed emulsion dispersion systems having an aqueous continuous phase, and aqueous systems which comprise adding thereto from 0.1 to 20% of the composition of claim 1.

11. A method for improving the rheological properties of oil-in-water emulsion systems which comprise adding thereto from 0.25 to 10% of the composition of claim 2.

12. A method for improving the rheological properties of oil-in-water emulsion systems which comprise adding thereto from 0.5 to 2% of the composition of claim 3.

13. A method for improving the rheological properties of oil-in-water emulsion systems, mixed emulsion dispersion systems having an aqueous continuous phase, and aqueous systems which comprises adding to the oil-in-water emulsion system from 0.1 to 20% by weight of the composition of claim 7.

14. A method for improving the rheological properties of oil-in-water emulsion systems, mixed emulsion dispersion systems having an aqueous continuous phase, and aqueous systems which comprises adding to the oil-in-water emulsion system from 0.25 to 10% by weight of the composition of claim 8.

15. A method for improving the rheological properties of oil-in-water emulsion systems, mixed emulsion dispersion systems having an aqueous continuous phase, and aqueous systems which comprises adding to the oil-in-water emulsion system from 0.5 to 2.0% by weight of the composition of claim 9.

* * * * *